United States Patent [19]

Dupin et al.

[11] 4,388,288
[45] Jun. 14, 1983

[54] PREPARATION OF SHAPED TITANIUM DIOXIDE CATALYST/CARRIER AND CATALYSIS OF GASEOUS SULFUR COMPOUNDS THEREWITH

[75] Inventors: Thierry Dupin, Garges les Gonesse; Gilbert Bouge, Salindres; Regis Poisson, Sevres, all of France

[73] Assignee: Rhone-Poulenc Industries, Paris, France

[21] Appl. No.: 256,978

[22] Filed: Apr. 23, 1981

[30] Foreign Application Priority Data

Apr. 23, 1980 [FR] France ................. 80 09126

[51] Int. Cl.³ .................. C01B 31/26; B01J 21/06
[52] U.S. Cl. ........................... 423/416; 423/420; 423/564; 423/574 R; 423/576; 423/615; 252/454; 252/455 R; 252/461
[58] Field of Search ............... 252/461, 454, 455 R; 423/615, 416, 420, 574, 576, 564; 501/134

[56] References Cited

U.S. PATENT DOCUMENTS

| | | | |
|---|---|---|---|
| 2,083,894 | 6/1937 | Connolly | 423/573 X |
| 2,553,402 | 5/1951 | Connolly et al. | 423/615 |
| 3,898,321 | 8/1975 | Marsh | 252/461 |
| 3,948,807 | 4/1976 | Fushigami et al. | 252/461 X |
| 4,061,596 | 12/1977 | Matsushita et al. | 252/461 X |
| 4,113,660 | 9/1978 | Abe et al. | 252/461 X |
| 4,141,962 | 2/1979 | Dupuy | 423/576 X |
| 4,166,147 | 8/1979 | Lange et al. | 423/610 X |

*Primary Examiner*—Earl C. Thomas
*Attorney, Agent, or Firm*—Burns, Doane, Swecker & Mathis

[57] ABSTRACT

Shaped titanium oxide catalysts/carriers useful, e.g., for sulfur recovery via Claus catalysis, are prepared by (i) intimately admixing powdered, poorly crystalline and/or amorphous titanium oxide, said titanium oxide powder being characterized by a weight loss on ignition ranging from 1 to 50%, water and from 0 to about 15% by weight of a shaping additive, (ii) next shaping the intimate admixture which results, and (iii) thence, optionally after drying, calcining the product shaped article.

24 Claims, 1 Drawing Figure

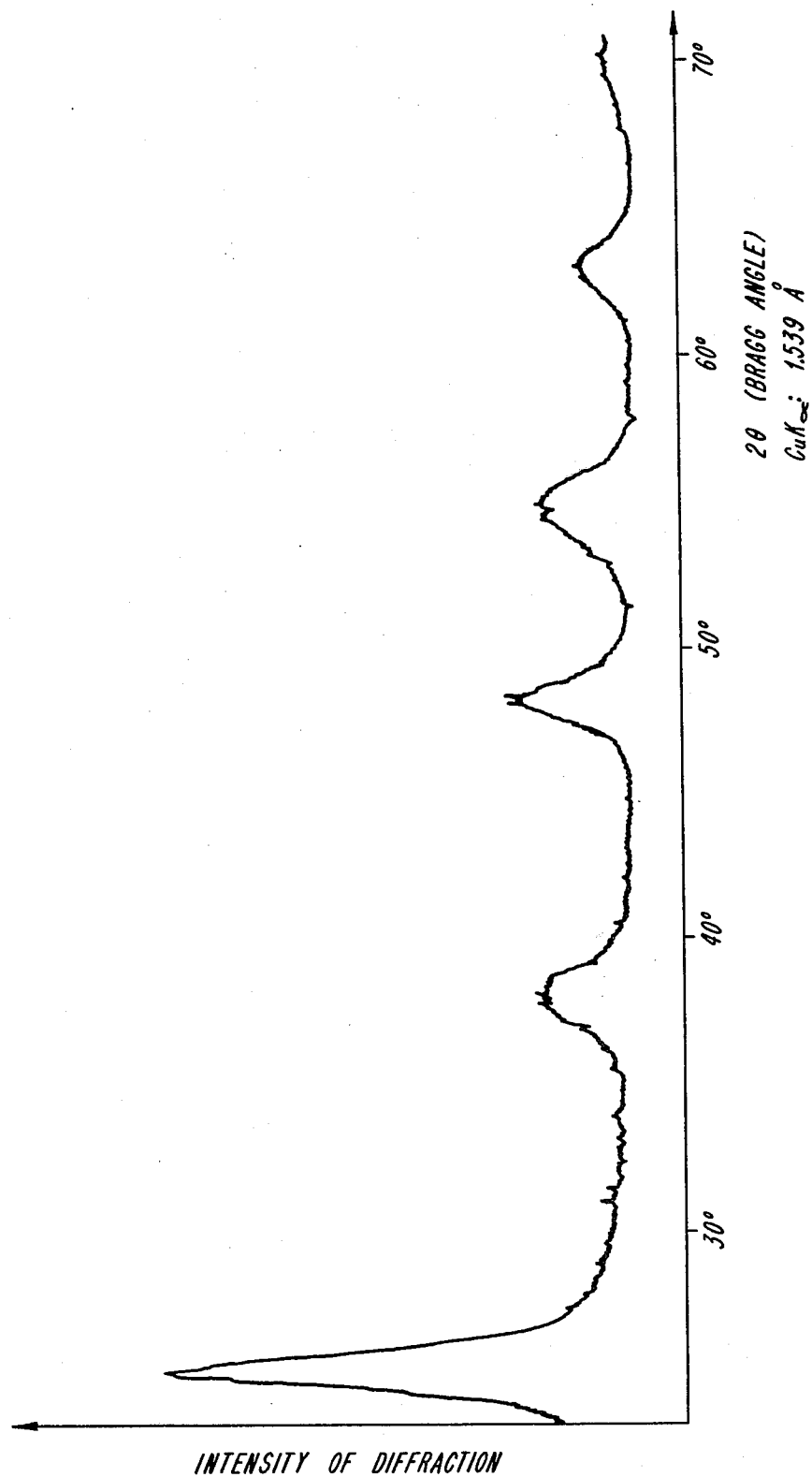

PREPARATION OF SHAPED TITANIUM DIOXIDE CATALYST/CARRIER AND CATALYSIS OF GASEOUS SULFUR COMPOUNDS THEREWITH

BACKGROUND OF THE INVENTION

1. Field of the Invention

The present invention relates to the preparation of shaped catalyst supports or catalysts, per se, based on titanium oxide, and to the use thereof for Claus catalysis.

2. Description of the Prior Art

Various processes are of course well known to this art for the preparation of shaped supports or catalysts based on titanium oxide, but such known processes are characterized by the disadvantages of providing final products which are lacking in mechanical strength and are otherwise wholly unsatisfactory from a textural point of view.

It has been proposed, according to published French Patent Application No. 2,336,177, to prepare catalysts or supports based on titanium oxide by calcining, at 200°–800° C., that starting material consisting of titanium oxide or a substance or precursor which can be converted to titanium oxide, in the presence of a metatitanic acid sol or gel. However, this process has been demonstrated to provide products, the specific surface area of which does not exceed about 50 $m^2/g$ and also of which pore volume, pore size distribution and mechanical strength too are not satisfactory. In particular, the process described in said published French Patent Application No. 2,336,177 does not permit control over the pore structure of the ultimate product in a simple or even effective manner. Furthermore, this process requires the use of a metatitanic acid sol or gel, which makes the process complicated and difficult to carry out.

Furthermore, it has also been proposed, according to U.S. Pat. No. 4,061,596, to prepare shaped catalyst supports based on titanium oxide by calcining titanium oxide at 400°–800° C. and then shaping the product and calcining the shaped product at 300°–800° C. This particular process provides supports, consisting of titanium oxide, the specific surface area of which does not exceed about 80 $m^2/g$ and of which pore volume, pore size distribution and mechanical strength remain unsatisfactory.

SUMMARY OF THE INVENTION

Accordingly, a major object of the present invention is the provision of an improved process for the preparation of titanium oxide catalysts and catalyst supports, the same being characterized by exceptional mechanical strengths and attrition resistance, very high specific surface areas and perfectly controlled pore size parameters, and which otherwise avoid those disadvantages to date plaguing the state of this art.

Another object of this invention is the provision of an improved process which is markedly economical vis-a-vis the prior art processes, requiring neither the special manufacture of a titanium sol or gel, nor pre-calcination of any starting materials, which is expensive from an energy viewpoint.

Briefly, the subject process features mechanically shaping an intimate powdery admixture of poorly crystalline and/or amorphous titanium oxide, water and shaping additives, followed by the calcination thereof.

BRIEF DESCRIPTION OF THE DRAWING

The FIGURE of Drawing is an X-ray diffraction spectrum or a poorly crystalline titanium oxide powder utilized in the improved process according to this invention.

DETAILED DESCRIPTION OF THE INVENTION

More particularly according to this invention, an improved process for the preparation of shaped titanium oxide catalysts and catalyst supports is provided, said process comprising:

(i) malaxating, or intimately mechanically admixing a mixture which comprises from about 1 to 40% by weight of water, from about 0 to 15% by weight of shaping additive or aid, and from about 45 to 99% by weight of a powder of poorly crystalline and/or amorphous titanium oxide having a loss on ignition of between about 1 and 50%;

(ii) next shaping such intimate admixture into predetermined shaped article; and (iii) then drying said shaped article, if necessary, and ultimately calcining the same.

The final products obtained in accordance with the process of the invention possess exceptional mechanical strength and attrition resistance, a specific surface area which can range up to about 300 $m^2/g$ and a very facilely adjusted pore size/volume structure.

The present invention also relates to the utilization of the final products obtained in accordance with the subject process as catalysts or catalyst supports, notably in Claus catalysis for the recovery of sulfur from gases containing, in particular, hydrogen sulfide, $H_2S$, sulfur dioxide, $SO_2$, and, if appropriate, organic sulfur compounds such as carbon disulfides, $CS_2$, and carbon oxysulfide, COS.

According to the first step in the process of the invention, a mixture comprising from about 1 to 40% by weight of water, from about 0 to 15% by weight of shaping additive, and from about 45 to 99% by weight of a powder of poorly crystalline and/or amorphous titanium oxide displaying a loss on ignition of between about 1 and 50% is initially malaxated, or intimately mechanically admixed. The indicated percentages by weight are based upon the total weight of the mixture.

Preferably, according to this first step, a mixture comprising from about 5 to 35% by weight of water, from about 0.1 to 10% by weight of shaping additives and from about 55 to 94.9% by weight of a powder of poorly crystalline and/or amorphous titanium oxide is malaxated.

The shaping additives which are used in this first step are those which are conventionally used in related shaping techniques. These additive impart, to the paste obtained by malaxation, the rheological properties suitable for shaping. Examples of shaping additives which are representative are: cellulose, carboxymethylcellulose, carboxyethylcellulose, tall oil, xanthane gums, surface-active agents, flocculants, such as polyacrylamides, carbon black, starches, stearic acid, polyacrylic acid, polyvinyl alcohol, biopolymers, glucose, polyethylene glycols, and the like.

The admixed powder of poorly crystalline and/or amorphous titanium oxide, displays a weight loss or ignition of between about 1 and 50% and preferably between 5 and 40%. Poorly crystalline titanium oxide is to be understood as meaning a titanium oxide, the X-ray spectrum of which possesses haloes in place of the principle lines of highly crystalline titanium oxide. Amorphous titanium oxide is to be understood as meaning a titanium oxide, the X-ray spectrum of which does not possess any diffraction line. The loss on ignition (LOI) of the powder is measured as the weight loss corresponding to the ratio:

LOI in % = $(P_o - P_1)/P_o$, in which
$P_o$ = initial weight of the starting material and
$P_1$ = weight of this starting material after calcination for 2 hours at 1,000° C. and cooling to ambient temperature in an anhydrous enclosure.

The starting material used in accordance with the process of the invention is an aqueous suspension of amorphous and/or poorly crystalline titanium oxide. According to a modified embodiment of the process of the invention, it is also possible to use any substance which can be converted to titanium oxide on calcination, such as, for example, orthotitanic and metatitanic acids and titanium oxide-hydroxides.

The aqueous suspension of amorphous and/or poorly crystalline titanium oxide can be obtained, in particular, from the conventional process for attack or acidulation of ilmenite with sulfuric acid, after the hydrolysis and filtration step. It can also be obtained via hydrolysis of titanium compounds of the formula $TiCl_{4-n}(OR)_n$, in which "n" is between 0 and 4 and R is an alkyl radical preferably selected from among methyl, ethyl, isopropyl, butyl, hexyl and stearyl. The suspension can also be prepared by precipitation of titanium salts with a base such as ammonia.

The powder having the desired LOI is obtained by drying the said suspension by conventional atomization or oven drying techniques, or by any other drying technique in which the resultant powder is maintained at a temperature below about 200° C.

The duration or time of malaxation of the mixture can vary over wide limits; it typically ranges from a few minutes to three hours.

According to a modified embodiment of the process of the invention, preferably up to about 30% by weight of a constituent selected from among silica, alumina, clays, silicates, titanium sulfates, ceramic fibers, and the like, is added to the mixture.

In the second step of the process of the invention, the mixture is shaped. The shaping can provide products in the form of spheres, cylinders, pellets, small balls, granules, a honeycomb, or the like, of varied dimensions. In particular, the shaped articles can be obtained with a pelletizer, a rotary granulator, an extrusion-molding machine, a machine for forming small balls, or a combination of an extrusion-molding machine and a rotary granulator.

According to the third step of the process of the invention, the resulting products are dried, if appropriate or necessary, and then calcined. The dried of undried product is calcined at a temperature between about 200° and 900° C. The calcination temperature makes it possible to adjust the specific surface area of the resulting product to between about 5 and 300 m²/g. Calcination at high temperature generally leads to a product having a small surface area and calcination at low temperature generally leads to a product having a large specific area.

Furthermore, the products obtained in accordance with the process of the invention have a total pore volume of between about 0.05 and 0.5 cm³/g, a very high mechanical strength, as measured by the particle-by-particle crushing method (PPC), and exceptional attrition resistance.

The pore volume of the product can be adjusted very easily in accordance with the process of the invention, in particular by adjusting the particle size of the titanium oxide powder, by considered selection of the shaping additives and the loss on ignition of the shaped mixture, and by adjusting the calcination temperature. Furthermore, as is well known to those skilled in the art, it is possible to adjust the pore volume by adding, to the mixture, pore-forming agents, such as, for example, wood charcoal, crystalline cellulose, starch, organic polymers, or the like.

The present invention also relates to the use of the final products obtained consistent with the invention as catalysts or catalyst supports in Claus catalysis for the recovery of sulfur from gases containing, in particular, hydrogen sulfide, sulfur dioxide and, if appropriate, organic sulfur compounds.

In the conventional Claus process, to which, moreover, the invention is not limited, the recovery of the sulfur from gases containing hydrogen sulfide and, if appropriate, organic sulfur compounds comprises two steps.

In a first step, the hydrogen sulfide is burned in the presence of an amount of air which is adjusted for converting a portion of the gas to sulfur dioxide, and then, in a second step, the resulting gaseous mixture is charged into a reactor containing a catalyst on which the following reaction takes place:

$$2H_2S + SO_2 \rightleftharpoons (3/n)S_n + 2H_2O. \tag{1}$$

It too has now been determined that the final products obtained in accordance with the process of the invention make it possible to achieve higher yields than those obtained with the conventional catalysts, for shorter contact times.

According to a first specific embodiment of the invention, a gaseous mixture comprising hydrogen sulfide is burnt, at about 1,00° C., with an amount of air which is adjusted for converting a proportion of the hydrogen sulfide present to sulfur dioxide. Sulfur can also be produced and the gas is passed through a first sulfur condenser after it has passed through a heat-recovery boiler. The gas is then cycled through a series of reactors (in general two or three) containing the catalyst obtained in accordance with the process of the invention, reaction (1) taking place in these reactors.

The gases which outlet are cooled in a sulfur condenser and reheated on entering each reactor.

Apart from hydrogen sulfide, the Claus gases can contain carbon compounds of sulfur, such as COS and $CS_2$, which are generally relatively stable in catalytic converters and which contribute to the emissions of $SO_2$ and sulfur compounds into the atmosphere, after incineration of the fumes, increasing the emissions by 20 to 50%. These very troublesome compounds are either already present in the gas to be treated or are formed during the first step at high temperature.

The final products obtained in accordance with the process of the invention make it possible to remove these extremely troublesome carbon derivatives of sulfur by hydrolysis in accordance with reactions (2), (3) and/or (4):

$$CS_2 + 2H_2O \rightarrow CO_2 + 2H_2S \quad (2)$$

$$CS_2 + H_2O \rightarrow COS + H_2S \quad (3)$$

$$COS + H_2O \rightarrow CO_2 + H_2S \quad (4)$$

According to a second specific embodiment of the invention, Claus gases containing, in particular, hydrogen sulfide, carbon disulfide and/or carbon oxysulfide and sulfur dioxide, required for carrying out reactions (1), (2), (3) and (4) simultaneously, are charged into a series of reactors (in general two or three) containing the catalyst obtained in accordance with the process of the invention.

The catalysts obtained in accordance with the process of the invention possess a greater activity than that obtained with the conventional catalysts for reaction (1). Thus, by carrying out this reaction with a better yield in a shorter time, it is possible to reduce the size of the reactors used.

Furthermore, these catalysts are not sensitive to the presence of oxygen in the gases, in amounts of up to about 0.5%, and they are not therefore deactivated by sulfation in the same fashion as the conventional catalysts. As a result, the catalysts according to the invention have a very much longer useful life than that of the known catalysts.

Furthermore, by carrying out reactions (2), (3) and/or (4) with yields close to 100%, the catalysts according to the invention make it possible to substantially improve the overall yield of sulfur recovery and to considerably reduce the harmfulness or hazards of the gases discharged into the atmosphere. Moreover, the catalysts of the invention are not sensitive to the presence of oxygen as regards reactions (2), (3) and/or (4).

In order to further illustrate the present invention and the advantages thereof, the following specific examples are given, it being understood that same are intended only as illustrative and in nowise limitative. In said examples, the various measurements or determinations were as follows:

(1) The specific surface areas (SBE) were measured by the conventional method of nitrogen absorption, referred to as the BET method.

(2) The pore volumes (TVP) and the average pore diameters ($\phi_m$) were determined by the conventional method of mercury penetration. A distinction was drawn between the micropore volume, Vmp, which corresponds to pore diameters of less than 500 Å, and the macropore volume, VMP, which corresponds to pore diameters of more than 500 Å; and average pore diameter can be determined for each category.

(3) The mechanical strength was measured, on the one hand, by the particle-by-particle crushing method (PPC). Same consisted of measuring the maximum compressive force which a granule can withstand before breaking, when the product was placed between two planes moving at a constant speed of 5 cm/minute. In the particular case of spheres, the force will be expressed in kilograms.

In the particular case of extrudates or pellets, the compression was applied perpendicular to one of the generatrices of the product, and the particle-by-particle crushing will be expressed as the ratio of the force to the length of the generatrix and will therefore be in kilograms/mm.

(4) The mechanical strength was measured, on the other hand, by the attrition resistance (AR). This method consisted of measuring the amount of dust produced by 100 grams of granules which were placed on a No. 24 sieve of diameter 20 cm, of the AFNOR X11-501 series, and vibrated for 10 minutes with the aid of a vibrator with the trademark Fenwick Rex. The AR is the weight of dust recovered.

EXAMPLE 1

A suspension of titanium oxide, obtained after hydrolysis and filtration in the conventional process for the attack or acidulation of ilmenite with sulfuric acid, was dried by passage through a heat exchanger, in which the suspension, and then the powder, were displaced by means of a worm screw which was heated by a heat-transfer fluid.

The loss on ignition of the resultant powder was 17.5%. The resulting product had a poorly crystalline anatase structure, the X-ray diffraction spectrum of which being depicted in the FIGURE of Drawing.

A mixture containing:
(i) 69% of the aforesaid powder,
(ii) 30.8% of water, and
(iii) 0.2% of polyacrylamide was prepared by malaxation, i.e., very intimate mechanical admixture, for 20 minutes.

Said mixture was mixture was then introduced into an extruder and extruded through a die having an orifice diameter of 5 mm. The resulting extrudates were dried at 110° C. for 24 hours and then calcined at 350° C. for 2 hours in an electric furnace, under a blanket of air.

The characteristics of the finished product were as follows:
SBE = 217 m$^2$g$^{-1}$
TVP = 29.6 cm$^3$/100 g
$\phi_m$ = 7 nm
PPC = 1.8 kb/mm
AR = 1.2%

EXAMPLE 2

The extruded product of Example 1 was reactivated in a propane-fired rotary furnace at a temperature of about 430° C. for 2 hours. It then had the following characteristics:
SBE = 128 m$^2$g$^{-1}$
TVP = 31 cm$^3$/100 g
$\phi_m$ = 11 nm
PPC = 1.5 kg/mm
AR = 2.2%

EXAMPLE 3

The extruded product of Example 1 was reactivated in an electric furnace at 800° C. and it then had the following characteristics:
SBE = 36 m$^2$g$^{-1}$
TVP = 26 cm$^3$/100 g
$\phi_m$ = 30.4 nm
PPC = 2.1 kg/mm
AR = 0.7%

EXAMPLE 4

The extruded product of Example 1 was reactivated in an electric furnace at 900° C. for 2 hours and it then had the following characteristics:
SBE = 14 m$^2$g$^{-1}$
TVP = 13 cm$^3$/100 g
$\phi_m$ = 36 nm
PPC = 3.5 kg/mm
AR = 0.2%

EXAMPLE 5

The extrudates obtained in accordance with Example 1 were not dried, but were calcined directly at 430° C. for 2 hours in an electric furnace, and the characteristics of the resulting product were then as follows:
SBE = 146 m$^2$g$^{-1}$
TVP = 30.3 cm$^3$/100 g
$\phi_m$ = 9 nm
PPC = 91.7 kg/mm
AR = 1.1%

EXAMPLE 6

The suspension of Example 1 was dried in a ventilated oven at 150° C. for 16 hours. The loss on ignition of the resultant powder was 34% and the powder had the same X-ray diffraction spectrum as the powder obtained in Example 1.

A mixture containing:
(i) 83% of this powder,
(ii) 16.8% of water, and
(iii) 0.2% of polyacrylamide (AD10)
was malaxated for 30 minutes.

Said mixture was extruded through a die having an orifice diameter of 5 mm and the resulting product was dried at 110° C. for 8 hours and then calcined at 400° C. for 5 hours in an electric furnace. The characteristics of the resulting product were as follows:
SBE = 136 m$^2$g$^{-1}$
TVP = 28.4 cm$^3$/100 g
$\phi_m$ = 9.2 nm
PPC = 1.7 kg/mm
AR = 1.7%

EXAMPLE 7

The suspension of Example 1 was dried in a ventilated oven at 100° C. for 24 hours. The loss on ignition of the resultant powder obtained was 47%. A mixture consisting of:
(i) 99% of this powder, and
(ii) 1% of water
was malaxated for one hour.

Said mixture was extruded through a die having an orifice diameter of 5 mm and the resultant product was dried at 110° C. for 8 hours and then calcined at 300° C. for 2 hours and possessed the following characteristics:
SBE = 247 m$^2$g$^{-1}$
TVP = 28.1 cm$^3$/100 g
$\phi_m$ = 4.0 nm
PPC = 2.5 kg/mm
AR = 0.6%

EXAMPLE 8

The powder obtained in accordance with Example 1 was malaxated for 40 minutes in the presence of water and polyvinyl alcohol, in the following proportions:
(i) 67% of powder,
(ii) 28% of water, and
(iii) 5% of polyvinyl alcohol.

Said mixture was extruded through a die having an orifice diameter of 5 mm and the extrudates were sliced apart, immediately upon exiting the die, by means of a rotating knife placed just at the outlet of the die.

The chopped extrudates were then placed in a vessel rotating at high speed, the walls of which were ribbed. Under the effect of the rotation, the chopped extrudates rolled over one another and over the walls, such that they acquired a spherical shape. The resulting spheres were subsequently dried at 100° C. for 8 hours and then calcined at 350° C. for 2 hours in an electric furnace; same possessed the following characteristics:
SBE = 185 m$^2$g$^{-1}$
TVP = 27 cm$^3$/100 g
$\phi_m$ = 5.5 nm
PPC = 9.3 kg
AR = 0.7%

EXAMPLE 9

The powder obtained in accordance with Example 1 was malaxated for 7 minutes in the presence of water and polysaccharide (Rhodopol XB 23), in the following proportions:
(i) 68% of powder,
(ii) 30% of water, and
(iii) 2% of polysaccharide.

The mixture was extruded through a 6 mm die, dried at 150° C. for 2 hours and then calcined at 400° C. for 2 hours in a propane-fired rotary furnace. The resulting product had the following characteristics:
SBE = 157 m$^2$g$^{-1}$
TVP = 29.3 cm$^3$/100 g
$\phi_m$ = 9.2 mm
PPC = 1.6 kg/mm
AR = 1.6%

EXAMPLE 10

The suspension of Example 1 was dried in an oven at 150° C. for 48 hours.

The resulting powder had a loss on ignition of 14%. This powder was malaxated for 2 hours in the presence of water and rice starch, in the following proportions:
(i) 61% of powder,
(ii) 37% of water, and
(iii) 2% of rice starch.

Said mixture was introduced into a twin-screw extruder and extruded through a 3 mm die. The resulting extrudates were dried at 110° C. for 24 hours and then calcined at 400° C. for 2 hours in an electric furnace.
SBE = 175 m$^2$/g
TVP = 40 cm$^3$/100 g
Vmp < 500 Å = 25 cm$^3$/100 g, centered at 9.0 nm
VMP > 500 Å = 15 cm$^3$/100 g, centered at 0.1 $\mu$m
PPC = 2.3 kg/mm
AR = 0.9%

EXAMPLE 11

Using the powder obtained in accordance with Example 10, the following mixture:
(i) 60% of powder,
(ii) 36% of water, and
(iii) 4% of rice starch
was malaxated for 2 hours.

After having been subjected to the same treatment as in Example 12, the extrudates had the following properties:
SBE = 169 m$^2$/g
TVP = 48 cm$^3$/100 g
Vmp < 500 Å = 25.5 cm$^3$/100 g, centered at 14 nm
VMP > 500 Å = 22.5 cm$^3$/100 g, centered at 0.13 $\mu$m
PPC = 1.0 kg/mm
AR = 1.2%

EXAMPLE 12

The suspension of Example 1 was dried in an atomizer at 110° C. The resulting powder had a LOI of 18% and had the same X-ray diffraction spectrum as was the case in Example 1.

A mixture containing:
(i) 69.2% of this powder,
(ii) 28.8% of water, and
(iii) 2% of carboxyethylcellulose
was malaxated for 45 minutes.

Said mixture was extruded through a 3 mm die. The extrudates were dried at 150° C. for 8 hours and then calcined at 450° C. for 2 hours. The resulting product possessed the following characteristics:
SBE = 117 $m^2g^{-1}$
TVP = 29 $cm^3$/100 g
$\phi_m$ = 10 nm
PPC = 1.3 kg/mm
AR = 2.7%

EXAMPLE 13

The powder obtained in accordance with Example 1 was malaxated for 1 hour, 30 minutes in the presence of water and carbon black, in the following proportions:
(i) 72% of powder,
(ii) 22% of water, and
(iii) 6% of carbon black.

Said mixture was compacted at a pressure of 480 kg/cm$^2$ in a pelletizer. The size of the pellets was as follows: diameter: 5 mm, length: 5 mm.

The product, dried at 110° C. for 24 hours, was calcined at 600° C. for 2 hours in an electric furnace, while maintaining a furnace sweep with a strong stream of air. The characteristics of the product were as follows:
SBE = 54 $m^2g^{-1}$
TVP = 27 $cm^3$/100 g
$\phi_m$ = 21 nm
PPC = 6.2 kg/mm
AR = 0.8%

EXAMPLE 14

The powder obtained in accordance with Example 1 was malaxated for 2 hours in the presence of water and polyethylene glycol (PEG), in the following proportions:
(i) 74% of water,
(ii) 21% of water, and
(iii) 5% of PEG.

Said mixture was pelletized as in the preceding example; the product, dried at 110° C. for 24 hours, was calcined at 350° C. for 2 hours in an electric furnace; the characteristics of the product were as follows:
SBE = 212 $m^2g^{-1}$
TVP = 26.5 $cm^3$/100 g
$\phi_m$ = 5.5 nm
PPC = 8.2 kg/mm
AR = 1.1%

EXAMPLE 15

The powder obtained in accordance with Example 6 was gradually mixed, in a rotating bowl (coating drum), with water to which glucose had been added. Upon completion of this operation, the overall balance indicated that the resulting spheres had the following composition:
(i) 66% of powder,
(ii) 30% of water, and
(iii) 4% of glucose.

The spheres had diameters of between 3 and 6 mm. Same were dried at 110° C. for 24 hours and then calcined at 800° C. for 2 hours. Same then had the following characteristics:
SBE = 35 $m^2g^{-1}$
TVP = 33 $cm^3$/100 g
$\phi_m$ = 42 nm
PPC = 5.9 kg
AR = 0.2%

EXAMPLE 16

The powder obtained in Example 1 was malaxated for 15 minutes in the presence of water and alumina in the form of boehmite, in the following proportions:
(i) 70% of powder,
(ii) 22% of water, and
(iii) 8% of alumina.

Said mixture was extruded on a single-screw extruder through a die having an orifice diameter of 5 mm. The extrudates were dried at 110° C. for 24 hours and then calcined at 450° C. for 2 hours. The characteristics of the product were as follows:
SBE = 156 $m^2g^{-1}$
TVP = 30.5 $cm^3$/100 g
$\phi_m$ = 7.0 nm
PPC = 1.7 kg/mm
AR = 1.4%

EXAMPLE 17

A similar procedure to that described in Example 16 was followed, using the following mixture:
(i) 70% of powder,
(ii) 21% of water, and
(iii) 9% of kaolin clay.

The resultant product was calcined at 750° C. for 2 hours and had the following characteristics:
SBE = 31 $m^2g^{-1}$
TVP = 24 $cm^3$/100 g
$\phi_m$ = 21.0 nm
PPC = 4.5 kg/mm
AR = 0.2%

EXAMPLE 18

The powder obtained in accordance with Example 1 was converted to granules in the form of spheres, in a rotary granulator, with the aid of a dilute solution of sodium silicate. The agglomerated finished product had the following composition:
(i) 72% of powder,
(ii) 25% of water, and
(iii) 3% of sodium silicate.

The spheres were dried at 110° C. overnight and then calcined at 300° C. for 2 hours. The product had the following characteristics:
SBE = 234 $m^2g^{-1}$
TVP = 29.5 $cm^3$/100 g
$\phi_m$ = 5.7 nm
PPC = 7.5 kg
diameter between 3 and 4 mm
AR = 0.3%

EXAMPLE 19

A suspension obtained after the hydrolysis of titanium tetrachloride was washed by decantation, filtered and then dried in an oven at 110° C. for 24 hours. The resulting powder had an amorphous X-ray diffraction pattern and its LOI was 18%.

A mixture consisting of this powder to which water and carboxymethylcellulose had been added in the following proportions:
(i) 66% of this powder,
(ii) 32% of water, and
(iii) 2% of carboxymethylcellulose was malaxated for 30 minutes.

Said mixture was then extruded through a 3 mm die and the extrudates were dried at 110° C. for 8 hours and then calcined at 700° C. for 2 hours. The characteristics of the product were as follows:

SBE=44 m²g⁻¹
TVP=26 cm³/100 g
$\phi_m$=19.5 nm
PPC=1.3 kg/mm
AR=0.6%

EXAMPLE 20

The present example illustrates the use of the catalysts of the invention, obtained in accordance with Examples 3 and 12, in the following reaction sequence:

$$2H_2S + SO_2 \quad (3/n)S_n + 2H_2O \quad (1)$$

A gas was charged through a series of 3 isothermal reactors under the following conditions:

(a) composition of the gas by volume at first reactor inlet:
$H_2S$: 9%
$SO_2$: 4.5%
$H_2O$: 20%
$N_2$: 66.5%
The temperature of the reactor was 300° C.
Catalyst: that obtained in accordance with Example 12.

(b) composition of the gas by volume at second reactor inlet:
$H_2S$: 2.5%
$SO_2$: 1.25%
$H_2O$: 27%
$N_2$: 69.25%
The temperature of the reactor was 250° C.
Catalyst: that obtained in accordance with Example 12.

(c) composition of the gas by volume at third reactor inlet:
$H_2S$: 1%
$SO_2$: 0.5%
$H_2O$: 30%
$N_2$: 68.5%
The temperature of the reactor was 220° C.
Catalyst: that obtained in accordance with Example 3.

The yields of sulfur reported in the table below were obtained by determination, by chromatographic analysis, of the inlet and outlet gases of each reactor. It should be noted that the thermodynamic efficiency was 86.2% for the first reactor, 79.5% for the second reactor and 72.5% for the third reactor.

By way of comparison, Table I below also reflects those results obtained using conventional alumina catalysts.

TABLE I

| | | Contact time in seconds | 0.25 | 0.5 | 1 | 2 | 3 |
|---|---|---|---|---|---|---|---|
| FIRST REACTOR | Catalyst of the invention Example 12 | | 82 | 85 | 86 | 86 | 86 |
| | Alumina | | 68 | 75 | 82 | 83 | 83 |
| SECOND REACTOR | Catalyst of the invention Example 12 | | | 67 | 72 | 78 | 79 |
| | Alumina | | | 48 | 59 | 70 | 71 |

TABLE I-continued

| | | | | |
|---|---|---|---|---|
| THIRD REACTOR | Catalyst of the invention Example 3 | 64 | 66 | 68 |
| | Alumina | 55 | 56 | 57 |

It is thus clearly apparent from Table I that the catalysts according to the invention make it possible to obtain yields of sulfur which are distinctly and unexpectedly greater than those obtained utilizing a conventional catalyst, for the same contact times.

Furthermore, the introduction of 800 ppm of oxygen causes absolutely no change in the yields obtained in the case of the catalysts of the invention, whereas the yields decrease by about 25% in the case of the conventional catalysts:

EXAMPLE 21

The present example illustrates the use of the catalysts of the inveention, obtained in accordance with Example 12, in the following reaction sequences:

$$2H_2S + SO_2 \quad (3/n)S_n + 2H_2O \quad (1)$$

$$CS_2 + 2H_2O \quad CO_2 + 2H_2S \quad (2)$$

A gas having the following composition by volume was charged through a reactor:
$H_2S$: 6%
$SO_2$: 4%
$CS_2$: 1%
$H_2O$: 28%
$N_2$: 61%

A temperature profile similar to that obtained in an industrial reactor (adiabatic) was applied to the reactor under the following conditions:

TABLE II

| Contact time in seconds | 1 | 2 | 3 | 4 |
|---|---|---|---|---|
| Temperature in °C. | 260 | 330 | 340 | 340 |

The gases entered the reactor at a temperature of 225° C.

The resulting hydrolysis yields (2) are reported in Table III below:

TABLE III

| Contact time in seconds | 1 | 2 | 3 | 4 |
|---|---|---|---|---|
| Catalyst of the invention | 60 | 93 | 99 | 100 |
| Alumina | 3 | 14 | 32 | 53 |

It is also apparent that the catalyst of the invention make it possible to obtain hydrolysis yields for $CS_2$ which too are distinctly and unexpectedly greater than those obtained with a conventional catalyst, for the same contact times.

The resulting yields of sulfur (1) are reported in Table IV below. It should be noted that the thermodynamic efficiency corresponding to the reaction conditions was 66.5%.

TABLE IV

| Contact time in seconds | 1 | 2 | 3 | 4 |
|---|---|---|---|---|
| Catalyst of the | 66 | 66 | 66 | 66 |

TABLE IV-continued

| invention | | | | |
|---|---|---|---|---|
| Alumina | 55 | 60 | 63 | 64 |

The introduction of 5,000 ppm of oxygen caused absolutely no change in the yields obtained in the case of the catalysts of the invention, whereas the yields decreased by half in the case of conventional catalysts.

EXAMPLE 22

The present example illustrates the use of the catalysts of the invention, obtained in accordance with Example 12, in the following reaction sequences:

$$2H_2S + SO_2 \rightarrow (3/n)S_n + 2H_2O \qquad (1)$$

$$COS + H_2O \rightarrow CO_2 + H_2S \qquad (4)$$

A gas having the following composition:
$H_2S$: 7.7%
$SO_2$: 4.4%
COS: 0.3%
$H_2O$: 28%
$N_2$: 60%
was charged through a reactor under the same conditions as those described in Example 21.

The resulting hydrolysis yields (4) are reported in Table V below:

TABLE V

| Contact time in seconds | 1 | 2 | 3 | 4 |
|---|---|---|---|---|
| Catalyst of the invention | 70 | 96 | 100 | 100 |
| Alumina | 4 | 17 | 39 | 60 |

It too is apparent that the catalysts of the invention make it possible to obtain hydrolysis yields for COS which are distinctly and unexpectedly greater than those obtained with a conventional catalyst, for the same contact times.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the preparation of a porous shaped titanium oxide catalyst/carrier, consisting essentially of (i) intimately admixing powdered, poorly crystalline and/or amorphous titanium oxide, said titanium oxide powder characterized by a weight loss on ignition ranging from 1 to 50%, water and from 0 to about 15% by weight of a shaping additive, (ii) next shaping the intimate admixture which results, and (iii) thence calcining the shaped article.

2. The process as defined by claim 1, wherein the shaped article is dried prior to the calcination (iii) thereof.

3. The process as defined by claims 1 or 2, wherein from about 45 to 99% by weight of the titanium oxide powder and about 1 to 40% by weight of water are intimately admixed.

4. The process as defined by claim 3, wherein from about 55 to 94.9% by weight of the titanium oxide power, about 5 to 35% by weight of water, and about 0.1 to 10% by weight of the shaping additive are intimately admixed.

5. The process as defined by claim 3, wherein the weight loss on ignition of the powder ranges from 5 to 40%.

6. The process as defined by claim 3, wherein the titanium oxide powder is obtained by drying an aqueous suspension of amorphous and/or poorly crystalline titanium oxide.

7. The process as defined by claim 6, wherein said aqueous suspension is obtained by attack on ilmenite with sulfuric acid, hydrolysis and filtration.

8. The process as defined by claim 3, wherein up to 30% by weight of an additional ingredient selected from the group consisting of silica, alumina, clay, silicate, titanium sulfate and ceramic fiber is intimately admixed.

9. The process as defined by claim 3, wherein the shaped article is calcined at a temperature ranging from about 200° to 900° C.

10. The process as defined by claim 3, including intimately admixing a shaping additive selected from the group consisting of cellulose, carboxymethylcellulose, carboxyethylcellulose, tall oil, xanthane gum, surface-active agent, flocculant, polyacrylamide, carbon black, starch, stearic acid, polyacrylic acid, polyvinyl alcohol, biopolymer, glucose, polyethylene glycol, and mixtures thereof.

11. The process as defined by claim 3, said titanium oxide powder intimately admixed being poorly crystalline titanium oxide.

12. The process as defined by claim 3, said titanium oxide powder intimately admixed being amorphous titanium oxide.

13. The process as defined by claim 3, said titanium oxide powder intimately admixed being a mixture of poorly crystalline titanium oxide and amorphous titanium oxide.

14. The process as defined by claim 3, said shaping (ii) being into spheres, cylinders, pellets, balls, granules or honeycomb.

15. The process as defined by claim 3, wherein a pore-forming agent is additionally intimately admixed.

16. A shaped titanium oxide catalyst/carrier prepared by the process as defined by claim 3.

17. The titanium oxide catalyst/carrier as defined by claim 16, having a specific surface area of from 5 to 300 $m^2/g$ and a total pore volume of from 0.05 to 0.5 $cm^3/g$.

18. In a process for sulfur removal via Claus catalysis, the improvement which comprises utilizing, as the catalyst/carrier therefor, the shaped titanium oxide catalyst/carrier as defined by claim 16.

19. In at least one of the catalyzed reaction sequences:

$$2H_2S + SO_2 \rightarrow (3/n)S_n + 2H_2O$$

$$CS_2 + 2H_2O \rightarrow CO_2 + 2H_2S$$

$$CS_2 + H_2O \rightarrow COS + H_2S \text{ or,}$$

$$COS + H_2O \rightarrow CO_2 + H_2S$$

the improvement which comprises utilizing, as the catalyst/carrier therefor, the shaped titanium oxide catalyst/carrier as defined by claim 16.

20. The process as defined by claim 6, wherein said aqueous suspension is obtained by hydrolysis of a titanium compound of the formula $TiCl_{4-n}(OR)_n$, in which $0 < n < 4$ and R is methyl, ethyl, isopropyl, butyl, hexyl or stearyl.

21. The process as defined by claim 6, wherein said aqueous suspension is obtained by precipitation of a titanium salt with a base.

22. A process for the preparation of a shaped titanium oxide catalyst/carrier, consisting essentially of admixing a powdered compound convertible upon calcination to a poorly crystalline and/or amorphous titanium oxide powder which is characterized by a weight loss on ignition ranging from 1 to 50%, water and from 0 to about 15% by weight of a shaping additive, (ii) next shaping the intimate admixture which results, and (iii) thence calcining the shaped article.

23. The process as defined by claim 22, wherein the convertible compound is orthotitanic acid, metatitanic acid, or titanium oxide-hydroxide.

24. The process as defined by claim 22 or 23, wherein from about 45 to 99% by weight of the convertible compound and about 1 to 40% by weight of water are intimately admixed.

* * * * *

REEXAMINATION CERTIFICATE (2052nd)

United States Patent [19]
Dupin et al.

[11] B1 4,388,288

[45] Certificate Issued  * Jul. 6, 1993

[54] PREPARATION OF SHAPED TITANIUM DIOXIDE CATALYST/CARRIER AND CATALYSIS OF GASEOUS SULFUR COMPOUNDS THEREWITH

[75] Inventors: Thierry Dupin, Garges les Gonesse; Gilbert Bouge, Salindres; Regis Poisson, Sevres, all of France

[73] Assignee: Rhone-Poulenc Industries, Paris, France

Reexamination Requests:
No. 90/002,495, Oct. 25, 1991
No. 90/002,334, Apr. 30, 1991

Reexamination Certificate for:
Patent No.: 4,388,288
Issued: Jun. 14, 1983
Appl. No.: 256,978
Filed: Apr. 23, 1981

[*] Notice: The portion of the term of this patent subsequent to Jun. 14, 2000 has been disclaimed.

[30] Foreign Application Priority Data

Apr. 23, 1980 [FR] France ............................. 80 09126

[51] Int. Cl.$^5$ .......................... C01B 31/26; B01J 21/06
[52] U.S. Cl. .................................... 423/416; 423/420; 423/564; 423/574 R; 423/576; 423/615; 502/159; 502/242
[58] Field of Search ........... 423/416, 420, 564, 574 R, 423/576, 615; 502/309

[56] References Cited

U.S. PATENT DOCUMENTS

| | | | |
|---|---|---|---|
| 4,061,596 | 12/1977 | Matsushita et al. | 106/73.33 |
| 4,085,193 | 4/1978 | Nakajima et al. | 423/239 |
| 4,113,660 | 9/1978 | Abe et al. | 423/239 |
| 4,141,962 | 2/1979 | Dupuy et al. | 423/230 |
| 4,207,209 | 6/1980 | Matsuda et al. | 423/213.2 |
| 4,422,958 | 12/1983 | Dupin | 423/244 R |
| 4,427,576 | 1/1984 | Dupin | 423/224 |
| 4,485,189 | 11/1984 | Dupin | 423/244 R |

FOREIGN PATENT DOCUMENTS

| | | |
|---|---|---|
| 38741 | 8/1991 | European Pat. Off. . |
| 2846476 | 5/1979 | Fed. Rep. of Germany . |
| 2224203 | 10/1974 | France . |
| 2254367 | 7/1975 | France . |
| 2301299 | 9/1976 | France . |
| 2336177 | 7/1977 | France . |
| 53-95893 | 8/1978 | Japan . |
| 25976 | of 1906 | United Kingdom . |
| 622324 | 4/1949 | United Kingdom . |

OTHER PUBLICATIONS

Decision of Japanese Appeal Board, Trial No. 63-18993, rejecting Rhone-Poulenc's equivalent Japanese Application No. 56-59304.

Sappo Wilska, "An X-Ray Diffraction Study to Determine the Effect of the Method of Preparation Upon the Crystal Structure of $TiO_2$," *Acta Chemica Scandinavica*, vol. 8, No. 10 (1954), pp. 1796–1801.

C. E. Capes, "Particle Size Enlargement," *Handbook of Powder Technology*, (vol. 1), ch. 2 (Elsevier Press, N.Y. 1989), pp. 40–43.

Kirk Othmer, "Titanium and Titanium Alloys," *Encyclopedia of Chemical Technology*, vol. 23 (3d ed. 1983), pp. 112–114.

Rudisill and Engelder, "Catalytic Activation of Titania", The Journal of Physical Chemistry, vol. XXX, (1926), pp. 106–113.

Steljna and Mars, "Catalytic Oxidation of Hydrogen Sulfice ... Porous Substances," Ind. Eng. Chem., Prod. Research & Develop., 16, No. 1, 1977, pp. 35–41.

"Pigmente, weiss", Ullmanns Encyklopadie der technischen Chemie, Band 18, pp. 574–578.

Decision of Japanese Patent Office Appeal Board in Trial No. 63-18993.

*Primary Examiner*—Gary P. Straub

[57] ABSTRACT

Shaped titanium oxide catalysts/carriers useful, e.g., for sulfur recovery via Claus catalysis, are prepared by (i) intimately admixing powdered, poorly crystalline and/or amorphous titanium oxide, said titanium oxide pow-

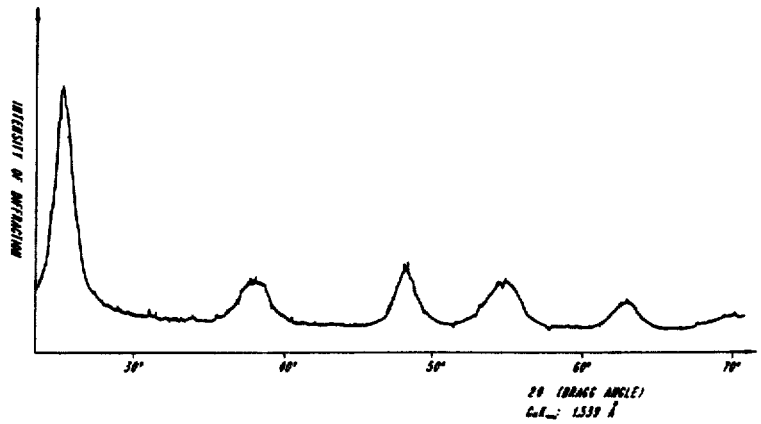

der being characterized by a weight loss on ignition ranging from 1 to 50%, water and from 0 to about 15% by weight of a shaping additive, (ii) next shaping the intimate admixture which results, and (iii) thence, optionally after drying, calcining the product shaped article.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–24 are cancelled.

New claims 25–40 are added and determined to be patentable.

*25. A process for the preparation of a shaped titanium dioxide product, consisting essentially of (i) intimately admixing (a) powdered, poorly crystalline, free metatitanic acid, said poorly crystalline, free metatitanic acid having an X-ray diffraction spectrum corresponding to that shown in the Figure of Drawing which illustrates the representative broad peaks and representative peak locations thereof, and said powder characterized by a weight loss on ignition ranging from 1% to 50%, (b) water and (c) from 0% to about 15% by weight of a shaping additive selected from the group consisting of cellulose, carboxymethylcellulose, carboxyethylcellulose, tall oil, xanthan gum, surfactant, flocculant, polyacrylamide, carbon black, starch, stearic acid, polyacrylic acid, polyvinyl alcohol, biopolymer, glucose, polyethylene glycol, or mixture thereof, (ii) next shaping the intimate admixture which results, (iii) thence calcining the shaped admixture, and (iv) recovering a shaped product consisting essentially of titanium dioxide.*

*26. The process as defined by claim 25, comprising drying said shaped admixture prior to the calcination (iii) thereof.*

*27. The process as defined by claim 25, consisting essentially of intimately admixing from about 45% to 99% by weight of said powdered, poorly crystalline, free metatitanic acid with from about 1% to 40% by weight of water and from about 0% to 15% by weight of shaping additive.*

*28. The process as defined by claim 27, consisting essentially of intimately admixing from about 55% to 94.9% by weight of said powdered, poorly crystalline, free metatitanic acid with from about 5% to 35% by weight of water and from about 0.1% to 10% by weight of shaping additive.*

*29. The process as defined by claim 25, said powder based on poorly crystalline, free metatitanic acid being characterized by a weight loss on ignition ranging from 5% to 40%.*

*30. The process as defined by claim 25, said calcining of said shaped admixture being at a temperature ranging from 200° to 900° C.*

*31. The process as defined by claim 25, wherein the shaping (ii) of said intimate admixture is by extrusion.*

*32. The process as defined by claim 25, wherein the shaping (ii) of said intimate admixture forms spheres or pellets.*

*33. The process as defined by claim 25, wherein the shaping (ii) of said intimate admixture forms granules.*

*34. A shaped titanium dioxide product prepared by the process as defined by claim 25.*

*35. A shaped titanium dioxide product prepared by the process as defined by claim 31.*

*36. A shaped titanium dioxide extrudate product prepared by the process as defined by claim 31, having a specific surface area ranging from 5 to 300 $m^2/g$ and a total pore volume ranging from 0.05 to 0.5 $cm^3/g$.*

*37. In a process for catalytically removing contaminating sulfur values from gaseous feedstreams comprising same, said process including at least one of the catalyzed reactions:*

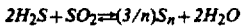

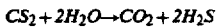

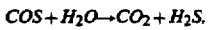

*the improvement which comprises employing, as the active catalyst for said reactions, the shaped titanium dioxide product as defined by claim 34.*

*38. The process as defined by claim 37, wherein said at least one reaction is the Claus reaction, $2H_2S + SO_2 \rightleftharpoons (3/n)S_n + 2H_2O$.*

*39. In a process for catalytically removing contaminating sulfur values from gaseous feedstreams comprising same, said process including at least one of the catalyzed reactions:*

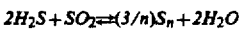

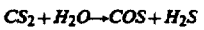

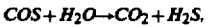

*the improvement which comprises employing, as the active catalyst for said reactions, the shaped titanium dioxide product as defined by claim 36.*

*40. The process as defined by claim 39, wherein said at least one reaction is the Claus reaction, $2H_2S + SO_2 \rightleftharpoons (3/n)S_n + 2H_2O$.*

* * * * *